(12) United States Patent
Bosch et al.

(10) Patent No.: US 12,261,826 B2
(45) Date of Patent: Mar. 25, 2025

(54) SYSTEMS AND METHODS FOR REDIRECTING SERVICE AND API CALLS FOR CONTAINERIZED APPLICATIONS

(71) Applicant: Cisco Technology, Inc., San Jose, CA (US)

(72) Inventors: Hendrikus G. P. Bosch, Aalsmeer (NL); Alessandro Duminuco, Milan (IT); Zohar Kaufman, South Natanya (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 233 days.

(21) Appl. No.: 17/857,678

(22) Filed: Jul. 5, 2022

(65) Prior Publication Data
US 2024/0015140 A1    Jan. 11, 2024

(51) Int. Cl.
*G06F 21/00*    (2013.01)
*G06F 9/455*    (2018.01)
(Continued)

(52) U.S. Cl.
CPC ...... *H04L 63/0281* (2013.01); *G06F 9/45558* (2013.01); *G06F 9/547* (2013.01);
(Continued)

(58) Field of Classification Search
CPC ............. H04L 63/0281; H04L 63/0236; G06F 9/45558; G06F 9/547; G06F 2009/4557;
(Continued)

(56) References Cited

U.S. PATENT DOCUMENTS 10,764,244 B1    9/2020  Mestery et al.
11,829,280 B1 *  11/2023 Zhang ................. G06F 11/3684
(Continued)

FOREIGN PATENT DOCUMENTS

WO       2022027528 A1    2/2022
WO    WO-2022056292 A1 *  3/2022    ........... G06F 9/4856

OTHER PUBLICATIONS

International Search Report and Written Opinion for International Application No. PCT/US2023/026046, mailed Oct. 4, 2023, 12 Pages.

*Primary Examiner* — Ghazal B Shehni
(74) *Attorney, Agent, or Firm* — Baker Botts L.L.P.

(57) ABSTRACT

A system of one embodiment allows for redirecting service and API calls for containerized applications in a computer network. The system includes a memory and a processor. The system processes a plurality of application workflows of a containerized application workload. The system then identifies at least one application workflow of the plurality of application workflows and at least one workflow-specific routing rule associated with the at least one application workflow. The system then determines at least one proxy server address for each identified application workflow based on the at least one associated workflow-specific routing rule. Then the system determines at least one proxy server address for each identified application workflow based on the at least one associated workflow-specific routing rule. The system then may communicate the at least one identified application workflow to the at least one proxy server using the at least one determined proxy server addresses.

17 Claims, 5 Drawing Sheets

(51) Int. Cl.
*G06F 9/54* (2006.01)
*H04L 9/40* (2022.01)

(52) U.S. Cl.
CPC .. *H04L 63/0236* (2013.01); *G06F 2009/4557* (2013.01); *G06F 2009/45595* (2013.01)

(58) Field of Classification Search
CPC . G06F 2009/45595; G06F 9/54; G06F 9/5072
See application file for complete search history.

(56) References Cited

U.S. PATENT DOCUMENTS

| | | | |
|---|---|---|---|
| 2011/0016473 A1* | 1/2011 | Srinivasan | G06F 9/5077 |
| | | | 718/105 |
| 2014/0331297 A1 | 11/2014 | Innes et al. | |
| 2015/0271207 A1 | 9/2015 | Jaiswal et al. | |
| 2018/0062858 A1 | 3/2018 | Xu et al. | |
| 2019/0065323 A1* | 2/2019 | Dhamdhere | G06F 11/1484 |
| 2019/0158537 A1 | 5/2019 | Miriyala | |
| 2020/0099610 A1 | 3/2020 | Heron et al. | |
| 2020/0112487 A1 | 4/2020 | Inamdar et al. | |
| 2020/0220848 A1 | 7/2020 | Patwardhan | |
| 2021/0019194 A1 | 1/2021 | Bahl et al. | |
| 2021/0099573 A1 | 4/2021 | van Rensburg et al. | |
| 2021/0124614 A1* | 4/2021 | Gupta | G06F 11/3409 |
| 2021/0200814 A1 | 7/2021 | Tal et al. | |
| 2021/0392477 A1 | 12/2021 | Taft et al. | |

* cited by examiner

SYSTEMS AND METHODS FOR REDIRECTING SERVICE AND API CALLS FOR CONTAINERIZED APPLICATIONS

TECHNICAL FIELD

The present disclosure relates generally to communication networks, and more specifically to systems and methods for redirecting service and API calls for containerized applications.

BACKGROUND

Network operators are increasingly deploying containers for developing software in continuous integration and continuous delivery (CI/CD) environments and running distributed applications and microservices in private networks, public clouds, or both (e.g., hybrid clouds or multi-clouds). Containers are an example of operating-system-level virtualization. Containers may be self-contained execution environments that have their own isolated CPU, memory, input/output (I/O), and network resources and share the kernel of a host operating system. Containers may be isolated from one other and from their hosts (physical or virtual servers). For example, they may have their own file systems. They may have no visibility into each other's processes. Their computing resources (e.g., processing, storage, networking, etc.) may be bounded. Containers may be easier to build and configure than virtual machines, and because containers may be decoupled from their underlying infrastructure and from host file systems, they may be highly portable across various clouds and operating system distributions. However, containers may introduce additional complexities for networking.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
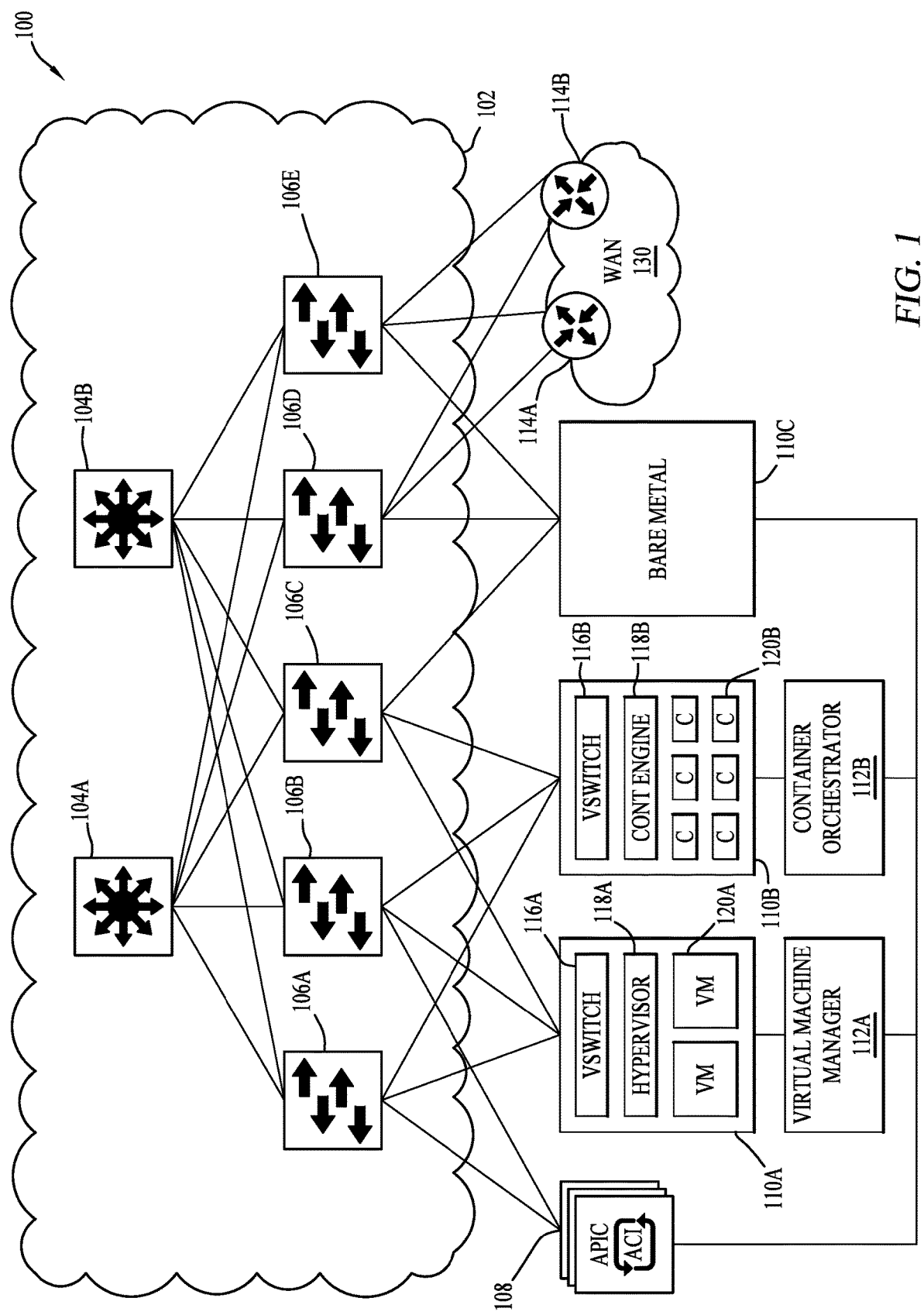
FIG. 1 illustrates an example computer network that provides for redirecting service and API calls for containerized applications.

According to one embodiment of the present disclosure, a system provides for redirecting service and API calls for containerized applications in a computer network. The system includes a memory and a processor. The system processes a plurality of application workflows of a containerized application workload. The system then identifies at least one application workflow of the plurality of application workflows and at least one workflow-specific routing rule associated with the at least one application workflow. The system then determines at least one proxy server address for each identified application workflow based on the at least one associated workflow-specific routing rule. Then the system determines at least one proxy server address for each identified application workflow based on the at least one associated workflow-specific routing rule. The system then may communicate the at least one identified application workflow to the at least one proxy server using the at least one determined proxy server addresses.

According to one embodiment of the present disclosure, a method provides for redirecting service and API calls for containerized applications in two different clusters in a computer network. The method includes processing a plurality of application workflows of a containerized application workload. The method then identifies at least one application workflow of the plurality of application workflows and at least one workflow-specific routing rule associated with the at least one application workflow. The method then determines at least one proxy server address for each identified application workflow based on the at least one associated workflow-specific routing rule. Then the method determines at least one proxy server address for each identified application workflow based on the at least one associated workflow-specific routing rule. The method may then encrypt session data associated with the application workflow using a public key of a public and private key pair based on a determination that the containerized applications are located in two different clusters in the computer network. The method then may communicate the at least one identified application workflow to the at least one proxy server using the at least one determined proxy server addresses.

Certain embodiments of the disclosure may provide one or more technical advantages. A technical advantage of one embodiment may be enhanced flow security in a containerized application environment. Certain embodiments may allow for the deployment of flow proxy services in a containerized application environment without the control of outside development groups or services. Some embodiments may allow for such proxy services to be hosted on a companion pod on the same node as an application workload. Another technical advantage of certain embodiments in this disclosure is that unencrypted session flows are properly encrypted while being routed through the containerized application environment in a computer network. One or more other technical advantages may be readily apparent to one skilled in the art from the figures, descriptions, and claims included herein.

Example Embodiments

Some containerized application environments (such as Kubernetes® or Docker®) may use a service mesh (such as ISTIO®) to capture network traffic and selectively provide for proxy and encryption services for TCP, TLS, HTTP and other sessions. In these containerized application environments, the traffic in a container may be routed through an Envoy® sidecar. The Envoy® sidecar then decides, based on a policy, what traffic needs to be proxied and which sessions need to be opened up and encrypted. The sidecar may also apply policies on these sessions, including traffic steering, application of encryption services, blocking and/or reporting the creation of sessions. While ISTIO®/Envoy® may be an effective solution to manage flow security of Kubernetes® applications, it requires application workloads to be altered and include the Envoy® sidecar. This injection of the Envoy® sidecar into the application workflow is considered complex, fragile, and operationally difficult. Additionally, there are other situations where enterprises demand all or some of the specific flows in a containerized application environment to be captured by and inspected through enterprise managed security proxies (i.e., man-in-the-middle services). For example, a security team may demand that all or some of the flows of certain workloads be inspected based on the vulnerability analysis of the workload, gathered network telemetry, or simply by statistical means. In these cases, a control point may be needed to selectively route flows to proxy services over secured and encrypted communication networks.

The present disclosure describes embodiments that are directed to providing a solution to the above problems by enabling man-in-the-middle services on a containerized application environment without the need to deploy or inject ISTIO® and Envoy® sidecar into application workloads or containers. In some embodiments, by redirecting application workflows through a dedicated proxy server within the containerized application environment, the same behavior as ISTIO® and Envoy® may be obtained. Because the present disclosure does not require the injection of a service mesh or sidecar, man-in-the-middle services may be provided without the typical complexity, fragility, and difficulty of traditional solutions.

FIG. 1 is an illustration of an example network 100 that provides for the redirecting of service and API calls for containerized applications. Network 100 may be implemented by one or more networks or clouds, including private clouds (e.g., an enterprise network, a colocation provider network, etc.) and/or public clouds (e.g., an Infrastructure as a Service (IaaS) network, a Platform as a Service (PaaS) network, a Software as a Service (SaaS) network, or other Cloud Service Provider (CSP) network), in a multi-cloud environment. An example of an implementation of the network 100 is Cisco® Application Centric Infrastructure (Cisco ACI®). However, one of ordinary skill in the art will understand that, for the network 100 and any other system discussed in the present disclosure, there may be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In the illustrated embodiment, network 100 includes a network fabric 102 including spine switches 104A and 104B (collectively, 104) and leaf switches 106A, 106B, 106C, 106D, and 106E (collectively, 106). The leaf switches 106 may connect to the spine switches 104 in a full-mesh topology or spine-and-leaf topology. The spine switches 104 may operate as the backbone of the network 100 and interconnect the leaf switches 106. For example, every leaf switch 106 may connect to every spine switch 104 in the network fabric 102, and the paths within the network fabric 102 may be randomly chosen so that the traffic load may be evenly distributed among the spine switches 104. In this manner, network performance may only slightly degrade if one of the spine switches 104 fails. If oversubscription of a link occurs (e.g., if more traffic is generated than may be aggregated on an active link at one time), network capacity may be scaled up by adding an additional spine switch 104 and extending uplinks to every leaf switch 106. This may add inter-layer bandwidth and reduce oversubscription. If access port capacity becomes an issue, a new leaf switch may be added by connecting it to every spine switch 104 and adding the network configuration to the new leaf switch. If no oversubscription occurs between the leaf switches 106 and their uplinks, then a non-blocking architecture may be achieved.

The leaf switches 106 represent any suitable network device capable of interconnecting spine switches 104 to servers 110. Leaf switches 106 may include fabric ports and access ports (non-fabric ports). The fabric ports may provide the uplinks to the spine switches 104, while the access ports may provide connectivity to physical servers (e.g., rack-mount servers, blade servers, or other computing devices) and virtual servers (e.g., virtual machines, containers, or other virtual partitions). In the illustrated embodiment, the leaf switches 106 may interconnect physical servers 110A, 110B, and 110C (collectively, 110) and virtual machines 120A, containers 120B, and other virtual servers (collectively, 120). Some examples of physical servers include Cisco® Unified Computing System (Cisco UCS®) B-Series Blade Servers, Cisco UCS® C-Series Rack Servers, Cisco UCS® S-Series Storage Servers, Cisco UCS® E-Series Blade Servers, and Cisco HyperFlex™ HX-Series nodes, among others.

In some embodiments, one or more of the physical servers 110, such as the physical server 110A, may each have instantiated thereon a hypervisor 118A for creating and running one or more virtual machines 120A. A hypervisor 118A represents any suitable application process capable of running and managing one or more virtual machines on a server 110. In some embodiments, the virtual machines 120A may host one or more containers. Alternatively, or in addition, one or more of the physical servers 110, such as the physical server 110B, may run a container engine 118B for hosting one or more containers 120B. Alternatively, or in addition, one or more of the physical servers 110 may run other software and include other components for supporting other types of virtual servers. Networks in accordance with various embodiments may include any number of physical servers hosting any number of virtual machines, containers, or other virtual servers. In some embodiments, one or more of the physical servers 110, such as the physical server 110C, may also operate as a bare metal server (i.e., a physical server that does not host virtual machines, containers, or other virtual servers).

The leaf switches 106 may also provide connectivity to various types of network devices, including network fabric interconnects (e.g., Cisco UCS® 6200 Series fabric interconnects, 6300 Series fabric interconnects, 6454 fabric interconnects, etc.); switches (e.g., Cisco® Catalyst switches, Cisco Nexus® switches, Cisco® Industrial Ethernet switches, Cisco Meraki® MS switches, etc.); routers (e.g., Cisco® Integrated Services Routers (ISRs), Cisco® Aggregation Services Routers (ASRs), Cisco® Network Convergence Systems (NCS) routers, Cisco Meraki® MX systems, etc.); access points (e.g., Cisco Aironet® access points, Cisco Meraki® MR access points, Cisco® Small Business access points, etc.); wireless network controllers (e.g., Cisco Catalyst® wireless LAN controllers (WLCs), Cisco® 8540 WLCs, Cisco® 5520 WLCs, Cisco® 3144 WLCs, etc.); and network management appliances (e.g., Cisco® Application Policy Infrastructure Controller (APIC™) appliances, Cisco® Digital Network Architecture (DNA™) Center appliances, Cisco® Software Defined- Wide Area Network (SD-WAN) vManage and vSmart appliances, Cisco Prime® appliances, etc.). In the illustrated embodiment, the leaf switches 106 are shown interconnecting network fabric controller 108, edge network devices 114A and 114B (e.g., switches, routers, gateways, etc.) (collectively, 114), and virtual switches 116A and 116B (collectively, 116) to the network fabric 102.

The network fabric controller 108 represents any suitable network device capable of being a centralized point of configuration and management for the network fabric 102. In some embodiments, the network fabric controller 108 may be implemented using Cisco APIC™. Cisco APIC™ may provide a centralized point of automation and management, policy programming, application deployment, and health monitoring for the network fabric 102. In the illustrated embodiment, the APIC™ may be embodied as a replicated, synchronized, and clustered set of network fabric controller appliances. In other embodiments, other configurations or network management platforms may be utilized for administering the network fabric 102, such as Cisco DNA™ Center, Cisco® SD-WAN, and Cisco Prime®, among others.

The network fabric controller 108 may operate in combination with one or more virtual machine managers 112A (e.g., VMware vSphere®, Microsoft® System Center Virtual Machine Manager, etc.), container orchestrators (e.g., Linux Foundation Kubernetes®, Docker Swarm®, Apache Mesos®, Mesosphere® Marathon, etc.) 112B, or other virtualization managers (collectively, 112) for deploying the virtual machines 120A, containers 120B, or other virtual servers. The virtual machine manager 112A may be used to administer a virtual switch 116A (e.g., Cisco® Application Virtual Switch (AVS), Cisco ACI™ Virtual Edge, Cisco Nexus® 1000VE, Cisco Nexus® 1000V, Open Virtual Switch (OVS), etc.), hypervisor 118A, and one or more virtual machines 120A instantiated on a single physical server 110A; a distributed virtual switch or multiple virtual switches, multiple hypervisors, and multiple virtual machines spanning multiple physical servers; or other virtual machine computing environments. Similarly, the container orchestration 112B may be used to administer a virtual switch 116B (e.g., OVS, OVS with Intel® Data Plane Development Kit (DPDK), OVS with Contiv plugin, etc.), container engine 118B (e.g., Docker®, CoreOS® rkt, Linux® Containers (LXC), etc.), and one or more containers 120B instantiated on a single physical server 110B; a distributed virtual switch or multiple virtual switches, multiple container engines, multiple container orchestrators, multiple service meshes, and multiple containers spanning multiple physical servers or virtual machines; and other containerized computing environments.

In addition to the network fabric controller 108, the leaf switches 106 may also connect the network fabric 102 to other network appliances and services, such as a firewall or other network security appliance or service (e.g., Cisco® Advanced Malware Protection (AMP) appliance, Cisco® Industrial Security Appliance (ISA), Cisco® Adaptive Security Appliance (ASA), Cisco® Identity Services Engine (ISE) appliance, Cisco Firepower® appliance, Cisco® Content Security Management appliance, Cisco® Security Packet Analyzer, etc.); network analytics appliance (e.g., Cisco Tetration® appliances); application accelerator; Network Address Translation (NAT) device; load balancer; Distributed Denial of Service (DDoS) mitigator; Deep Packet Inspection (DPI) device; Intrusion Prevention System (IPS); Intrusion Detection System (IDS); Internet Protocol Security (IPSec) system; Session Border Controller (SBC); traffic monitor; Evolved Packet Core (EPC) device; WAN optimizer; and so forth. These network appliances and services may be implemented in hardware as physical network appliances and/or in software using general-purpose Central Processing Units (CPUs), Graphics Processing Units (GPUs), Network Processing Units (NPUs), Network Interface Controllers (NICs), smart NICs, and so forth (e.g., virtualized network appliances and services executing within virtual machines (e.g., Virtual Network Functions (VNFs)), containers (e.g., Cloud-Native Functions (CNFs)), or other virtual servers). In some embodiments, the network fabric controller 108 may provide automatic service insertion based on policies defined by an administrator of the network 100. The network fabric controller 108 may use service graphs (e.g., ordered sets of service function nodes between a set of endpoints and a set of network appliances or service specified for an application) to push the needed configuration and security policies to the network 100.

In some embodiments, the leaf switches 106 may also connect endpoint groups (EPGs) to the network fabric 102 and other networks (e.g., Wide Area Network (WAN) 130). EPGs may be groupings of applications, or application components, and tiers for implementing forwarding and policy logic. EPGs may allow for separation of network policy, security, and forwarding from addressing by using logical application boundaries. EPGs may be used in the network 100 for mapping applications in the network. For example, EPGs may include a grouping of endpoints in the network 100 indicating connectivity and policy for applications.

In the illustrated embodiment, the leaf switches 106D and 106E may operate as border leaf switches in communication with the edge network devices 114A and 114B (e.g., switches, routers, gateways, etc.) for providing connectivity to the Wide Area Network (WAN) 130. WANs represent any suitable computer network capable of connecting geographically dispersed nodes over long-distance communications links or networks, such as over the Internet (e.g., Digital Subscriber Line (DSL), cable, etc.), Multi-Protocol Label Switching (MPLS) or other private packet-switched network (e.g., Metro Ethernet, Frame Relay, Asynchronous Transfer Mode (ATM), etc.), mobile networks (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol may refer to a set of rules defining how the nodes interact with each other. Computer networks may be further interconnected by an intermediate network node, such as a router, to extend the effective size of each network. The nodes may include any communication device or component, such as a computer, server, blade, hypervisor, virtual machine, container, process (e.g., running in a virtual machine, container, or other virtual partition), switch, router, gateway, host, device, network, and so forth.

In some embodiments, the network 100 may connect to one or more Communication Service Provider (CSP) networks via a private network connection (not shown) or the WAN 130 for additional processing, memory, storage, network, and other computing resources in an architecture sometimes referred to as a hybrid cloud or multi-cloud. A hybrid cloud may include the combined computing resources of a private cloud (e.g., the network 100) and a public cloud (e.g., a CSP network) to perform workloads of an operator of the private cloud. A multi-cloud may combine computing resources of a private cloud with the resources of multiple public clouds.

Although the network fabric 102 is illustrated and described herein as a spine-and-leaf architecture, one of ordinary skill in the art will readily recognize that various embodiments may be implemented based on any network topology, including any enterprise or data center network fabric. Indeed, other architectures, designs, infrastructures, and variations are contemplated herein. For example, the principles disclosed herein are applicable to topologies including three-tier (e.g., core, aggregation, and access levels), fat tree, mesh, bus, hub and spoke, and so forth. In some embodiments, the leaf switches 106 may be top-of-rack switches configured according to a top-of-rack architecture. In other embodiments, the leaf switches 106 may be aggregation switches in any particular topology, such as end-of-row or middle-of-row topologies. In some embodiments, the leaf switches 106 may also be implemented using aggregation switches.

Moreover, the topology illustrated in FIG. 1 and described herein is readily scalable and may accommodate a large number of components, as well as more complicated arrangements and configurations. For example, the network may include any number of fabrics 102, which may be geographically dispersed or located in the same geographic area. Thus, network nodes may be used in any suitable network topology, which may include any number of physical servers, virtual machines, containers, switches, routers, appliances, controllers, gateways, or other nodes interconnected to form a large and complex network. Nodes may be coupled to other nodes or networks through one or more interfaces employing any suitable wired or wireless connection, which provides a viable pathway for electronic communications.

Figure 2:
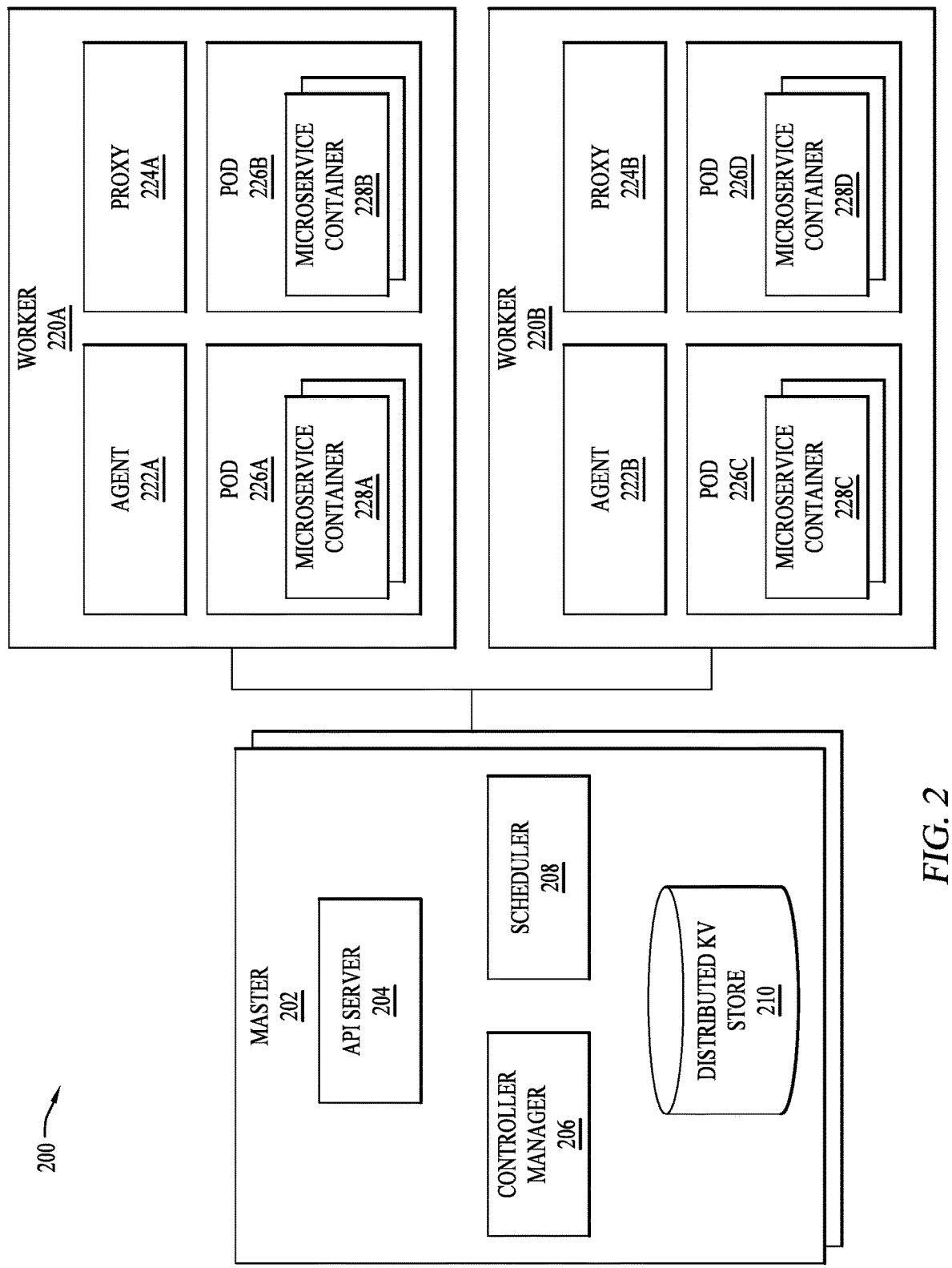
FIG. 2 illustrates an example of a container orchestration platform in accordance with an embodiment.

FIG. 2 illustrates a block diagram of an example of a container orchestrator 200 that may be implemented for the container orchestrator 112B. In some embodiments, the container orchestrator 200 may be based on Kubernetes®. Kubernetes® is an open-source container orchestration system for automating deployment, scaling, and management of containers across clusters of hosts (e.g., physical server, virtual machines, etc.). However, other embodiments may deploy other container orchestrators, such as Docker Swarm®, Apache Mesos®, Mesosphere® Marathon, and the like.

The container orchestrator 200 may include one or more clusters or collections of processing, memory, storage, network, and other computing resources that the container orchestrator 200 may use to run the various workloads of a network. Each cluster may include one or more hosts. In the illustrated embodiment, the cluster includes a master 202 and workers 220A and 220B (collectively, 220) (sometimes also referred to as nodes, minions, and the like). Although there is one master 202 here, other embodiments may include multiple masters for redundancy and high availability.

Master 202 represents any suitable control plane for the cluster. For example, the master 202 may be responsible for the global, cluster-level scheduling of pods (e.g., sets of one or more containers) and the handling of events (e.g., starting up a new pod when additional computing resources are needed). The master 202 may include an Application Programming Interface (API) server 204, a controller manager 206, a scheduler 208, and a distributed Key Value (KV) store 210. These components of the master 202 may run on any host in the cluster but usually run on the same (physical or virtual) machine without workers 220.

API server 204 represents any suitable process capable of operating as the front-end to expose the API (e.g., Kubernetes® API) of the container orchestrator 200. API server 204 may include Kubernetes® kube-apiserver or similar API server processes of other container orchestration programs. The API server 204 may scale horizontally (e.g., scale by deploying more instances) as it may be stateless and store data in the distributed KV store 210.

Controller manager 206 represents any suitable process that includes a collection of controllers for monitoring the shared state of the cluster and making changes to the shared state. Each controller may be a separate process logically, but to reduce complexity, the collection of controllers may be compiled into a single binary and execute within a single process. Controller manager 206 may be Kubernetes® kube-controller-manager, Kubernetes® cloud-controller-manager, and the like. The controller manager 206 may include a node controller, replication controller, endpoints controller, an account and token controller, route controller, service controller, volume controller, among other controllers. The node controller may be responsible for managing pod availability and bringing nodes back up when they go down. The replication controller may ensure that each replication controller instance in the container orchestrator 200 has the correct number of pods. The endpoints controller may control endpoint records in the API and manage domain name system (DNS) resolution of a pod or set of pods. The account and token controller may create accounts and API access tokens for new namespaces (e.g., names of resources of virtual clusters). The route controller may set up routes in the underlying infrastructure. The service controller may be responsible for creating, updating, and deleting network services (e.g., firewalling, load balancing, deep packet inspection, etc.). The volume controller may be responsible for creating, attaching, and mounting volumes.

Scheduler 208 represents any suitable process capable of monitoring newly created pods that have no worker node assigned to them and select a worker node for them to run on. Scheduler 208 may be Kubernetes® kube-scheduler. This may involve evaluation of individual and collective resource requirements, hardware/software/policy constraints, worker node affinity and anti-affinity specifications, pod affinity and anti-affinity specifications, data locality, inter-workload interference, and deadlines, among other factors.

Distributed KV store 210 represents any suitable high-availability distributed data store. Distributed KV store may be Kubernetes® etcd. The container orchestrator 200 may use the distributed KV store 210 to store cluster state information. In a small, short-lived cluster, a single instance of the KV store 210 may run on the same host as other components of the master 202. For larger clusters, the distributed KV store 210 may include a cluster of hosts (e.g., 3-5 nodes) for providing redundancy and high availability.

Workers 220 represent any suitable process capable of maintaining running pods and providing a runtime environment for the container orchestrator 200. The container runtime may be responsible for running containers. The container runtime may include Docker®, Linux Foundation Containerd®, CoreOS® rktlet, Open Container Initiative™ runC, and the like. Each of the workers 220 may correspond to a single host, which may be a physical server or virtual machine. The workers 220A and 220B may respectively include agents 222A and 222B (collectively, 222) (e.g., Kubernetes® kubelet), proxies 224A and 224B (collectively, 224) (e.g., Kubernetes® kube-proxy, OVS, OVS/Contiv, etc.), and pods 226A and 226B and 226C and 226D (collectively, 226). The agents 222 may run on the workers 220 in the cluster and ensure that one or more microservice containers 228A, 228B, 228C, and 228D (collectively, 228) are running in the pods 226A, 226B, 226C, and 226D, respectively. The agents 222 may oversee communications with the master 202, including downloading keys, certificates, and the like from the API server 204, mounting volumes, or reporting the status of the workers 220 and the pods 226.

Pods 226 represent any suitable process that helps to manage groups of closely related microservice containers 228 that may depend on each other and that may need to cooperate on the same host to accomplish their tasks. The pods 226 may be scheduled together and run on the same physical server or virtual machine. The microservice containers 228 in each of the pods 226 may have the same IP address and port space; they may communicate via localhost or standard inter-process communication. In addition, the microservice containers 228 may have access to shared local storage on each of the workers 220. The shared storage may be mounted for each of the microservice containers 228.

Proxies 224 represent any suitable process responsible for container networking, including low-level network housekeeping for the workers 220, reflection of local services, TCP and User Datagram Protocol (UDP) forwarding, finding cluster IPs through environmental variables or Domain Name System (DNS). In some embodiments, the container orchestrator 200 may employ a networking model that relates how the master 202, the workers 220, the pods 226, and the microservice containers 228 interact with one another, such as ensuring that the microservice containers 228 may communicate with one another without NAT, the workers 220 may communicate with the microservice containers 228 (and vice-versa) without NAT, and the IP address that the microservice containers 228 see themselves as are the same IP addresses that other network elements see them as. This networking model may assign IP addresses at the pod level such that the microservice containers 228 share an IP address and port space. This networking model may also enable the microservice containers 228 to reach other microservice containers' ports via localhost.

In some embodiments, the container orchestrator 200 may enable intra-node communication or pod-to-pod communication within the same host via a local file system, IPC mechanism, or localhost. The container orchestrator 200 may also support various approaches for inter-node communication or pod-to-pod communication across hosts, including Layer 2 (L2) of the Open Systems Interconnection (OSI) model (e.g., switching), Layer 3 (L3) (e.g., routing), and overlay networking. The L2 approach may involve attaching an L2 network to a host's physical network interface controller (NIC) and exposing a pod directly to the underlying physical network without port mapping. Bridge mode may be used to enable the pod to interconnect internally so that traffic does not leave its host unless necessary. The L3 approach may not use overlays in the data plane, and pod-to-pod communication may occur over IP addresses leveraging routing decisions made by the hosts and external network routers. For example, pod-to-pod communication may occur over Border Gateway Protocol (BGP) peering to not leave the host, and NAT for outgoing traffic. An overlay approach may use a virtual network that may be decoupled from the underlying physical network using tunneling technology (e.g., Virtual Extensible LAN (VXLAN), Generic Routing Encapsulation (GRE), Segment Routing (SR), etc.). Pods in the virtual network may find each other via tunneling. In addition, L2 networks may be isolated from one another, and L3 routing may be utilized for pod-to-pod communication across hosts.

In some embodiments, the container orchestrator 200 may support labels (also sometimes referred to as tags, metadata, and the like) and selectors. Labels may be key-value pairs used to group together sets of objects, such as pods. Labels may also specify attributes of objects that may be meaningful and relevant to network users. There may be an N×N relationship between objects and labels. That is, each object may have multiple labels, and each label may be applied to different objects. Each label on an object may have a unique key. The label key may include a prefix and a name. The prefix may be optional. If the prefix exists, it may be separated from the name by a forward slash (/) and be a valid DNS subdomain. The prefix and the name may have specified maximum lengths (e.g., 253 and 63 characters, respectively). Names may start and end with an alphanumeric character (a-z, A-Z, 0-9) and include alphanumeric characters, dots, dashes, and underscores in between. Values may follow the same restrictions as names.

Label selectors may be used to select objects based on their labels and may include equality-based selectors and set-based selectors. Equality (and inequality) based selectors may allow for selection of objects by key name or value. In some embodiments, matching objects must satisfy specified equality (= or ==) or inequality (!=) operators. Set-based selectors may enable selection of objects according to a set of values, including objects that are "in" or "not in" the set or objects having a key that "exists." An empty label selector may select every object in a collection. A null label selector (which may only be possible for optional selector fields) may select no objects.

In some embodiments, the container orchestrator 200 may employ a service model (e.g., Kubernetes® service model). A Kubernetes® service is an abstraction which defines a logical set of pods and a policy by which to access them (with each instance of a Kubernetes® service sometimes referred to as a microservice). The set of pods targeted by a Kubernetes® service may be determined by a label selector. Kubernetes® services may be published or discovered through DNS or environment variables. Kubernetes® services may be of different types, such as a ClusterIP, NodePort, LoadBalancer, or ExternalName Kubernetes® service. A ClusterIP may expose a Kubernetes® service on a cluster-internal IP such that the Kubernetes® service may only be reachable from within the cluster. A NodePort may expose a Kubernetes® service on each worker node's IP at a static port. A ClusterIP, to which the NodePort may route, may be automatically created when provisioning the NodePort. The NodePort may be contacted from outside the cluster by requesting <NodeIP>:<NodePort>. A LoadBalancer may expose a Kubernetes® service externally using a load balancer. NodePorts and ClusterIPs, to which the external load balancer routes, may be automatically created when provisioning the LoadBalancer. An ExternalName may map a Kubernetes® service to the contents of a specified Mayonical Name (CNAME) record in DNS.

Applications may depend on various network functions from their infrastructure, such as load balancing, traffic management, routing, health monitoring, security policies, service and user authentication, protection against intrusion and DDoS attacks, and so forth. These network functions are conventionally implemented as discrete physical or virtual network appliances. Providing an application with these network functions may require logging into each appliance to provision and configure the network functions. This process was possible when managing dozens of monolithic applications but may be impractical in a microservice architecture that may require provisioning and configuration of hundreds or thousands of containers. A service mesh may resolve these issues of scale as well as provide monitoring, scalability, and high availability through APIs instead of dedicated appliances.

Figure 3:
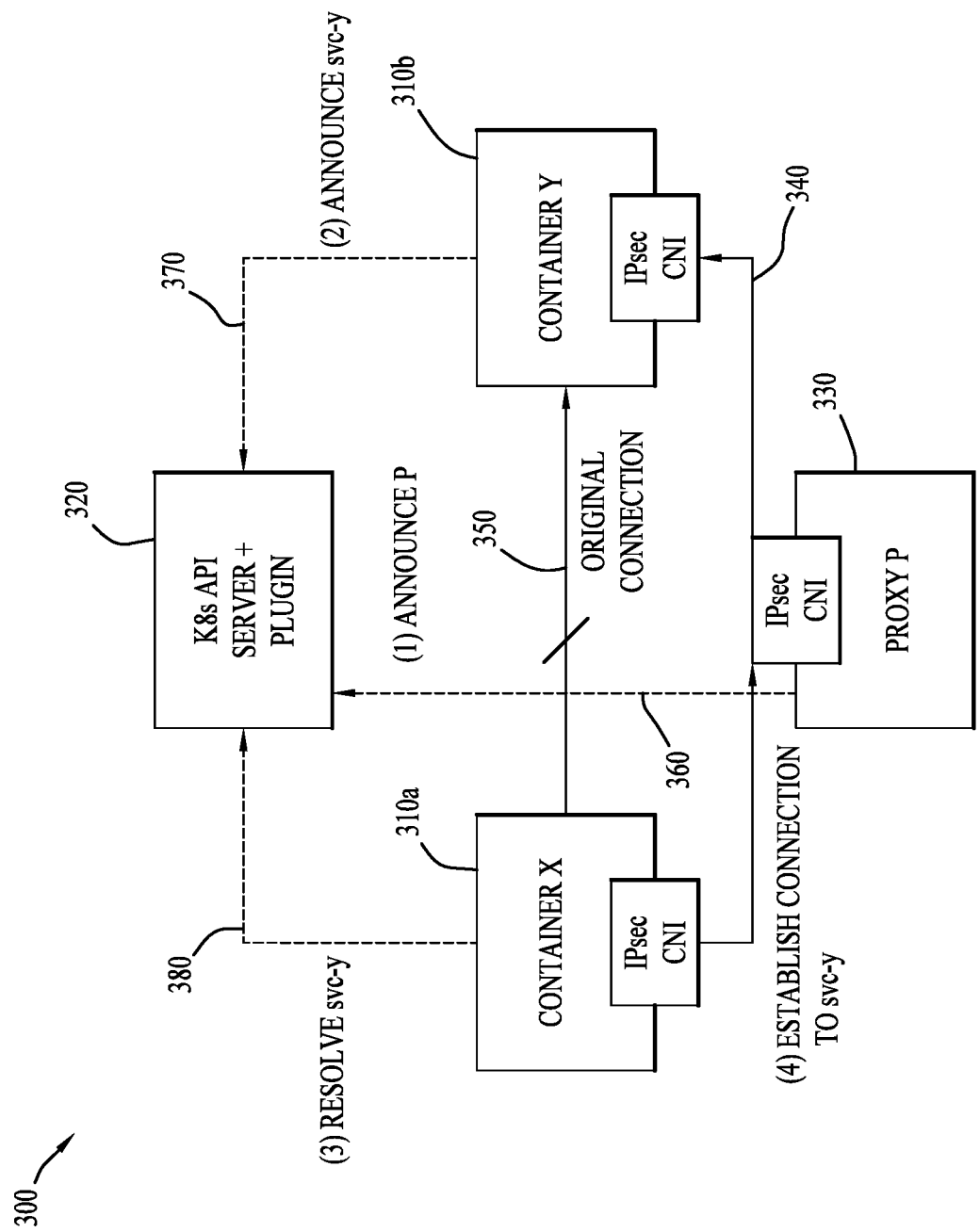
FIG. 3 illustrates an example computer network that provides for redirecting service and API calls for containerized applications, according to some embodiments of the present disclosure.

FIG. 3 illustrates an example computer network 300 that provides for redirecting service and API calls for containerized applications according to some embodiments of the present disclosure. Network 300 may be based on one or both of the above embodiments disclosed in FIGS. 1 and 2. In the illustrated embodiment, network 300 includes a plurality of containers 310, one or more API servers 320, and one or more proxy servers 330. Container 310a of the plurality of containers 310 is communicatively coupled over network 300 to the proxy server 330 via tunnel 340. Similarly, proxy server 330 is communicatively coupled over network 300 to container 310b of the plurality of containers 310 via tunnel 340. Container 310a may be communicatively coupled to container 310b over network 300 via flow 350. Proxy server 330 may be communicatively coupled to API server 320 via proxy announcement 360. Container 310b may be communicatively coupled to API server 320 via container announcement 370. Container 310a may be communicatively coupled to API server 320 via resolve DNS flow 380.

Container 310 represents any suitable operating-system-level virtualization or application-level virtualization that allows for an application, and its related configurations files, libraries, and dependencies required for the app, to run seamlessly across different environments. Container 310 may be a self-contained execution environment that has its own isolated CPU, memory, input/output (I/O), and network resources and share the kernel of a host operating system. Containers 310 may be isolated from one other and from their hosts (physical or virtual servers). For example, they may have their own file systems. They may have no visibility into each other's processes. Their computing resources (e.g., processing, storage, networking, etc.) may be bounded. Containers 310 may be easier to build and configure than virtual machines, and because containers may be decoupled from their underlying infrastructure and from host file systems, they may be highly portable across various clouds and operating system distributions. Containers 310 may include containers that are formed by any container orchestration platform such as Kubernetes®, Docker Swarm®, Apache Mesos®, Mesosphere® Marathon, and the like.

API server 320 represents any suitable network device or process capable of operating as the front-end to expose the API of the container orchestrator 200. API server 320 may include Kubernetes® kube-apiserver or similar API server processes of other container orchestration programs. The API server 320 may scale horizontally (e.g., scale by deploying more instances) as it may be stateless and store data in the distributed KV store 210. In some embodiments, API server 320 represents any suitable network device or process that is capable of managing (Domain Name Server) DNS resolution. In some embodiments, DNS resolution on API server 320 allows for a query of specific applications, services, pods, or containers using consistent DNS names instead of the actual IP addresses. In some embodiments, every service defined in a cluster (including the API Server 320 itself) is assigned a DNS name. Each pod is assigned a namespace. A DNS query may return different results based on the namespace of the pod making it. In certain embodiments, DNS queries that do not specify a namespace are limited to the pod's namespace.

Proxy server 330 represents any suitable network device or process that is capable of providing proxy services to network 300. The proxy services that proxy server 330 provides may include capturing all network traffic, managing inbound and outbound traffic, and other such proxy services. Proxy server 330 may be a self-contained execution environment that has its own isolated CPU, memory, input/output (I/O), and network resources and share the kernel of a host operating system. Proxy server 330 may be isolated from one other and from their hosts (physical or virtual servers). In some embodiments, proxy server 330 may be the same as a container 310 but provides proxy services. In some embodiments, proxy server 330 may provide dynamic service discovery, load balancing, Hypertext Transfer Protocol Version 1.1 (HTTP1.1), Hypertext Transfer Protocol Version 2 (HTTP2), and general-purpose Remote Procedure Call (gRPC) proxies (with or without mTLS), circuit breakers, health checks, staged rollouts with percentage-based traffic splits, fault injection, and rich metrics, among other features. In some embodiments, proxy server 330 may be hosted in a companion pod on the same node as an application workload. In some embodiments, the proxy server 330 may be hosted on a different node relative to the application workload. In certain embodiments, proxy server 330 may be based on Envoy® or other techniques and may be hosted as a service in its own right (on premises or on the cloud). In some embodiments, there may be one or more proxy servers 330.

Tunnel 340 represents any suitable flow of data packets, traffic, or messages that may be securely exchanged among the devices in network 300 from container 310a to proxy server 330 and then from proxy server 330 to container 310b. Tunnel 340 may be exchanged over links using predefined network communication protocols such as Transmission Control Protocol/Internet Protocol (TCP/IP), User Datagram Protocol (UDP), Asynchronous Transfer Mode (ATM) protocol, Frame Relay protocol, or any other suitable protocol. In some embodiments, tunnel 340 may include standard TCP encrypted flows, TLS encrypted flows, HTTPS, REST, OpenAPI, gRPC, and any other suitable flow. In the illustrated embodiment, to ensure the communication between container 310a and proxy server 330 and between proxy server 330 and container 310b is secure, proxy server provides its own IPSec tunnel endpoint. Tunnels 340 may also represent any suitable point-to-point tunnel that communicatively couples container 310a to proxy server 330 and commutatively couples proxy server 330 to 310b. Tunnels 340 may include Generic Routing Encapsulation (GRE) tunnels, full-mesh GRE tunnels, IP Tunnels, UDP tunnels, IPSec Tunnels, Layer 2 Tunneling Protocol (L2TP), Point to Point Tunneling Protocol, Layer 2 Forwarding (L2F), SSL, and the like. Tunnels 340 may be formed over direct communication links from containers 310 to proxy server 330 or may be formed over communication links that span different networks. In some embodiments, proxy server 330 provides its own tunnel 340 endpoints. In some embodiments, API server 320 is provided with the configuration needed to enable to containers 310 under its control to establish the connections to proxy server 330. In certain embodiments, tunnels 340 are formed using a IP-sec based Container Network Interface (CNI). In a containerized application environment, CNI is responsible for inserting a network interface into containers in a network. A CNI may provide network connectivity of containers in a network. A CNI may comprise specification and libraries for writing plugins to configure network interfaces of containers. A CNI is associated with a unique IP address to ensure proper routing. In some embodiments, a CNI is a plugin that supports networking between containers. In some embodiments, the session data that is associated with an application workflow that is communicated over tunnel 340 may be encrypted using a public key of a public and private key pair.

Flow 350 represents any suitable flow of data packets, traffic, or messages that may be exchanged among the devices in network 300 from container 310*a* to container 310*b*. Flow 350 may be exchanged over links using predefined network communication protocols such as Transmission Control Protocol/Internet Protocol (TCP/IP), User Datagram Protocol (UDP), Asynchronous Transfer Mode (ATM) protocol, Frame Relay protocol, or any other suitable protocol. In some embodiments, flow 350 may include standard TCP encrypted flows, TLS encrypted flows, HTTPS, REST, OpenAPI, gRPC, and any other suitable flow. In the illustrated embodiment, if no proxying services are needed by an application workflow running on container 310*a*, network 300 may rely on standard containerized application environment behavior to provide container 310*a* with an IP address and port for container 310*b*. Container 310*a* may then communicate to container 310*b* via flow 350 to the specified IP address and port for container 310*b*.

Proxy announcement 360 represents any suitable flow of data packets, traffic, or messages that may be exchanged among the devices in network 300 from proxy server 330 to API server 320. Proxy announcement 360 may be exchanged over links using predefined network communication protocols such as Transmission Control Protocol/Internet Protocol (TCP/IP), User Datagram Protocol (UDP), Asynchronous Transfer Mode (ATM) protocol, Frame Relay protocol, or any other suitable protocol. In some embodiments, proxy announcement 360 may include standard TCP encrypted flows, TLS encrypted flows, HTTPS, REST, OpenAPI, gRPC, and any other suitable flow. In the illustrated embodiment, proxy announcement 360 includes a flow of data that indicates that proxy server 330 is available on network 300. Proxy announcement 360 may include data that indicates the IP address and port names for proxy server 330.

Container announcement 370 represents any suitable flow of data packets, traffic, or messages that may be exchanged among the devices in network 300 from container 310*b* to API server 320. Container announcement 370 may be exchanged over links using predefined network communication protocols such as Transmission Control Protocol/Internet Protocol (TCP/IP), User Datagram Protocol (UDP), Asynchronous Transfer Mode (ATM) protocol, Frame Relay protocol, or any other suitable protocol. In some embodiments, container announcement 370 may include standard TCP encrypted flows, TLS encrypted flows, HTTPS, REST, OpenAPI, gRPC, and any other suitable flow. In the illustrated embodiment, container announcement 370 includes a flow of data that indicates that container 310*b* is running an application service and is available on network 300. Container announcement 370 may include data that indicates the IP address and port names for container 310*b*. In some embodiments, container announcement 370 may include data that indicates namespace and DNS names for container 310*b*.

Resolve DNS flow 380 represents any suitable flow of data packets, traffic, or messages that may be exchanged among the devices in network 300 from container 310*a* to API server 320. Resolve DNS flow 380 may be exchanged over links using predefined network communication protocols such as Transmission Control Protocol/Internet Protocol (TCP/IP), User Datagram Protocol (UDP), Asynchronous Transfer Mode (ATM) protocol, Frame Relay protocol, or any other suitable protocol. In some embodiments, resolve DNS flow 380 may include standard TCP encrypted flows, TLS encrypted flows, HTTPS, REST, OpenAPI, gRPC, and any other suitable flow. In the illustrated embodiment, resolve DNS flow 380 includes a flow of data that indicates that container 310*a* seeks to communicate to a service running on container 310*b* and needs API server 320 to resolve the DNS of container 310*b*. If proxy services are needed, then in certain embodiments resolve DNS flow 380 may include data indicating that it needs to communicate to proxy server 330 via tunnel 340.

According to an exemplary embodiment of operation, network 300 represents a containerized application environment including one or more application workflows that are running on one or more devices in network 300. Proxy server 330 may announce that it is on network 300 by communicating to API server 320 via proxy announcement 360. For example, proxy announcement 360 may announce that it is on a particular IP address and is open at a particular port number. API server 320 receives proxy announcement 360 and may process data included in proxy announcement 360. Similarly, container 310*b* may announce to API server 320 via container announcement 370 that it is on network 300 and is running an application service. For example, container 310*b* may be running an application service "svc-y".

Still according to the exemplary embodiment, network 300 may include containers 310*a* and 310*b*. Container 310*a* may be running one or more application workflows. Container 310*a* may identify at least one application workflow and then may identify at least one workflow-specific routing rule associated with the application workflow. For example, container 310*a* may be running an application workflow that seeks to communicate with an application service running on container 310*b* (such as "svc-y"). In a typical containerized application environment, container 310*a* may communicate to container 310*b* via flow 350 based on the workflow-specific routing rule associated with the application workflow. This may be orchestrated through a container networking interface (CNI) plugin of containerization services such as Kubernetes® or Docker®. In the exemplary embodiment, however, container 310*a* may also determine that proxy services are needed for the identified application workflow based on the identified workflow-specific routing rule associated with the application workflow. If container 310*a* determines that proxy services are needed for the identified application workflow, then container 310*a* proceeds to communicate to API server 320 via resolve DNS flow 380 to resolve the appropriate DNS address of the service that the application workflow running on container 310*a* seeks to communicate with via tunnel 340. Once API server 320 receives container 310*a*'s request to resolve the DNS of the service that the application workflow running on container 310a seeks to communicate with, API server 320 may establish tunnel 340 from container 310a to proxy server 330 by determining a proxy server address based on the requested application service. API server may further establish a tunnel 340 from proxy server 330 to container 310b. Once tunnel 340 has been established, container 310a may proceed to communicate the application workflow to proxy server 330. Proxy server 330 may process application workflow, including tracking all inbound and outbound traffic and perform other proxy services to application workflow. In some embodiments, proxy server 330 may proceed to communicate application workflow to one or more nodes in computer network 300, including container 310b.

In some embodiments, container 310a may store the at least one workflow-specific routing rule and production related primitives for a plurality of application workflows. Container 310a may receive a production execution command. Once the production execution command has been received, container 310a may generate a containerized application workload using the production related primitive. Once the containerized application workload has been generated, then container 310a may execute the containerized application workload.

In some embodiments and as an example, assume that container 310a may be assigned an IP address of 10.0.1.1/32 and that container 310b may be assigned an IP address of 10.0.1.2/32. When 310a and 310b need to communicate using these addresses their traffic is automatically routed overflow 350. Assume further proxy server 330 may be reached via tunnel 340 at 10.0.2.1/24. When a service (for example service Y) announces itself on network 300 over container announcement 370, API server 320 may note that service Y is available on and when a service (for example service X) needs to set up a connection (for example an API connection), it resolves the IP address of service Y by requesting over resolve DNS flow 380 to API server 320. API server 320 may then make a policy decision. If no proxying services are needed, then API server 320 may provide container 310a with instructions that it may rely on standard containerization services behavior and communicate application workflow overflow 350. However, if a flow needs to be captured by proxy server 330, then API server 320 may optionally first prepare proxy server 330 with the workload information for services X and Y and allocate an IP address in proxy server 330's routable range and port for the session. Then API server may communicate to service X running on container 310a with the allocated proxy parameters of proxy server 330 (such as IP address and port). Doing so may allow for proxy server 330 to be informed that if a request from service X (running on container 310a) arrives, it may deduce that a connection needs to be established to service Y running on container 310b. In some embodiments, a request's Service Name Indication (SNI) may be used to find service Y running on container 310b. In some embodiments, if service Y running on container 310b needs to communicate with an external service running on a different node, network, container (for example, for serving OpenAPI services), service Y running on container 310b may first resolve the name through the API server 320 which also will perform a DNS lookup and may perform the same procedure as identified above as was performed for internal services.

Modifications, additions, or omissions may be made to network 300 without departing from the scope of the disclosure. For example, while the above exemplary embodiment discusses the API server 320 resolving the DNS to determine the proxy server 330's proxy server address, any suitable device in network 300 or identified in networks 100 and 200 as identified above in FIGS. 1 and 2 may be capable of doing so. As another example, the API server (or any suitable device) may determine the proxy server address of proxy server 330 using at least one of a service identity and a domain name service name that is associated with each identified application workflow. In other embodiments, a CNI plugin may determine the proxy server address of proxy server 330. As another example, the containerized application in some embodiments may be a virtual runtime environment and the application workflows represent deployed application services at the production level. While the preferred embodiment of the present disclosure is not used in combination with service mesh implementations such as ISTIO® and Envoy®, in some embodiments the present disclosure may be used with service mesh implementations such as ISTIO® and Envoy®. In some embodiments, proxy server 330 may be based on service mesh implementations such as ISTIO® and Envoy®. As another example of a modification, some embodiments extend the containers 310 with root certificates associated with proxy server 330 to enable to the proxy server 330 to open TLS encrypted flows.

Further modifications may be made to network 300 without departing from the scope of the disclosure. For example, the above examples discuss proxy sever 330 and API server 320 performing the flow routing decisions when tasked with a policy decision. These flow routing decisions may also be performed by a security controller such as Cisco® SecureCN® or any other control point for the workload.

Figure 4:
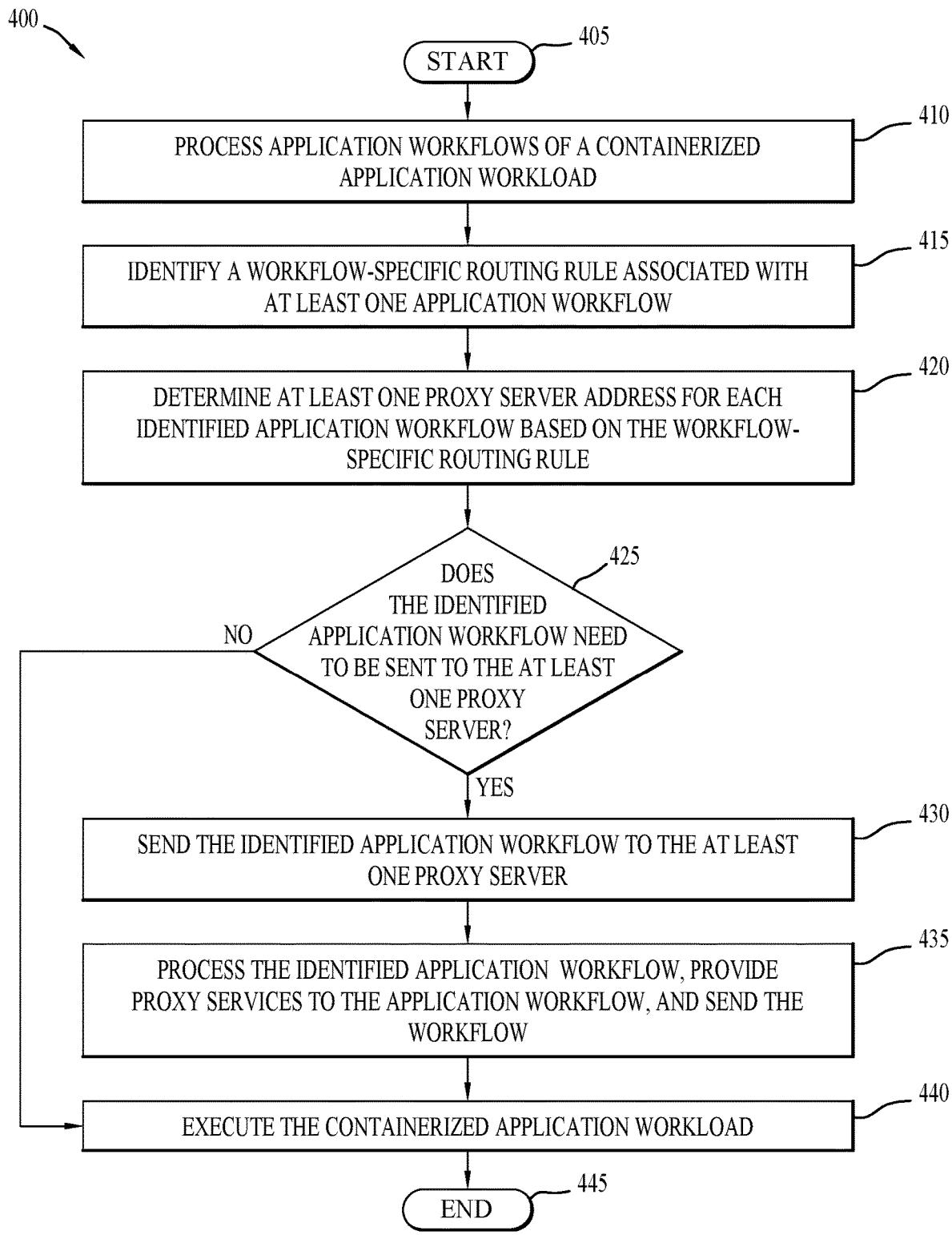
FIG. 4 illustrates an example method for redirecting service and API calls for containerized applications based on the applications' workflows, according to some embodiments of the present disclosure.

FIG. 4 illustrates an example method for redirecting service and API calls for containerized applications based on the applications' workflows, according to some embodiments of the present disclosure.

At step 405, method 400 begins. In some embodiments, method 400 may begin by container 310a storing at least one workflow-specific routing rule and production related primitives for a plurality of application workflows. Container 310a may then receive a production execution command. Once the production execution command has been received, container 310a may generate a containerized application workload using the production related primitives. In some embodiments, once the containerized application workload has been generated, then container 310a may execute the containerized application workload.

At step 410, container 310a processes application workflows of a containerized application workload. In some embodiments, container 310a may process application workflows by determining which application services each application workflow may call when executed.

At step 415, container 310a identifies a workflow-specific routing rule associated with at least one application workflow. In some embodiments, container 310a identifies a workflow-specific routing rule for an application workflow by determining whether there is a policy applied to the application workflow. In some embodiments, container 310a identifies a workflow-specific routing rule for an application workflow by identifying each application service that an application workflow seeks to call on when executed. In some embodiments, container 310a stores the identified routing rules associated with the application workflow in a routing table.

At step 420, API server 320 determines at least one proxy server address for each identified application workflow based on at least one routing rule associated with an application workflow. In some embodiments, step 420 begins when resolve DNS flow 380 includes a flow of data that indicates that container 310*a* seeks to communicate to a service running on container 310*b* and needs API server 320 to resolve the DNS of container 310*b*. If proxy services are needed, then in certain embodiments resolve DNS flow 380 may include data indicating that it needs to communicate to proxy server 330 via tunnel 340. API server 320 may determine a proxy server address by resolving the DNS of the application service that an application workflow running on container 310*a* seeks to communicate with. For example, API server 320 may be given the application and namespace of the application service that an application service running on container 310*a* seeks to communicate with. Based on the application and namespace of the application service, API server 320 may resolve the DNS container 310*b* and based on the address of that container, API server 320 may provide proxy server address to proxy server 330. In some embodiments, API server 320 may determine at least one proxy server addressed for each identified application workflow using a Container Network Interface plugin.

At step 425, container 310*a* determines whether the identified application workflow needs to be sent to proxy server 330. In some embodiments, container 310*a* makes the determination of whether an identified application workflow needs to be sent to proxy server 330 by whether there is a policy applied to the application workflow. For example, a policy may include that all sessions of this application workflow need to be captured by proxy server 330 for security reasons. In some embodiments, container 310*a* makes the determination of whether an identified application workflow needs to be sent to a proxy server 330 by whether the identified application workflow is being sent to an external service outside of network 300. If the identified application workflow needs to be sent to proxy server 330, then method 400 proceeds to step 430. If the identified application workflow does not need to be sent to proxy server 330, then method 400 proceeds to step 440.

At step 430, container 310*a* sends the identified application workflow to proxy server 330. In some embodiments, API server 320 may establish tunnel 340 from container 310*a* to proxy server 330 based on the proxy server address of proxy server 330 that it determined at step 420. In some embodiments, API server 320 may established 340 using a container network interface (CNI) plugin.

At step 435, proxy server 330 process application workflow, provides proxy services to the application workflow, and sends application workflow to container 310*b*. In some embodiments, proxy server 330 may provide dynamic service discovery, load balancing, Hypertext Transfer Protocol Version 1.1 (HTTP1.1), Hypertext Transfer Protocol Version 2 (HTTP2), and general-purpose Remote Procedure Call (gRPC) proxies (with or without mTLS), circuit breakers, health checks, staged rollouts with percentage-based traffic splits, fault injection, and rich metrics, among other features.

At step 440, one or more devices in network 300 executes the containerized application workload including the identified application workflow.

At step 445, method 400 may end. In some embodiments, method 400 may then proceed to additional steps according to the present disclosure.

Figure 5:
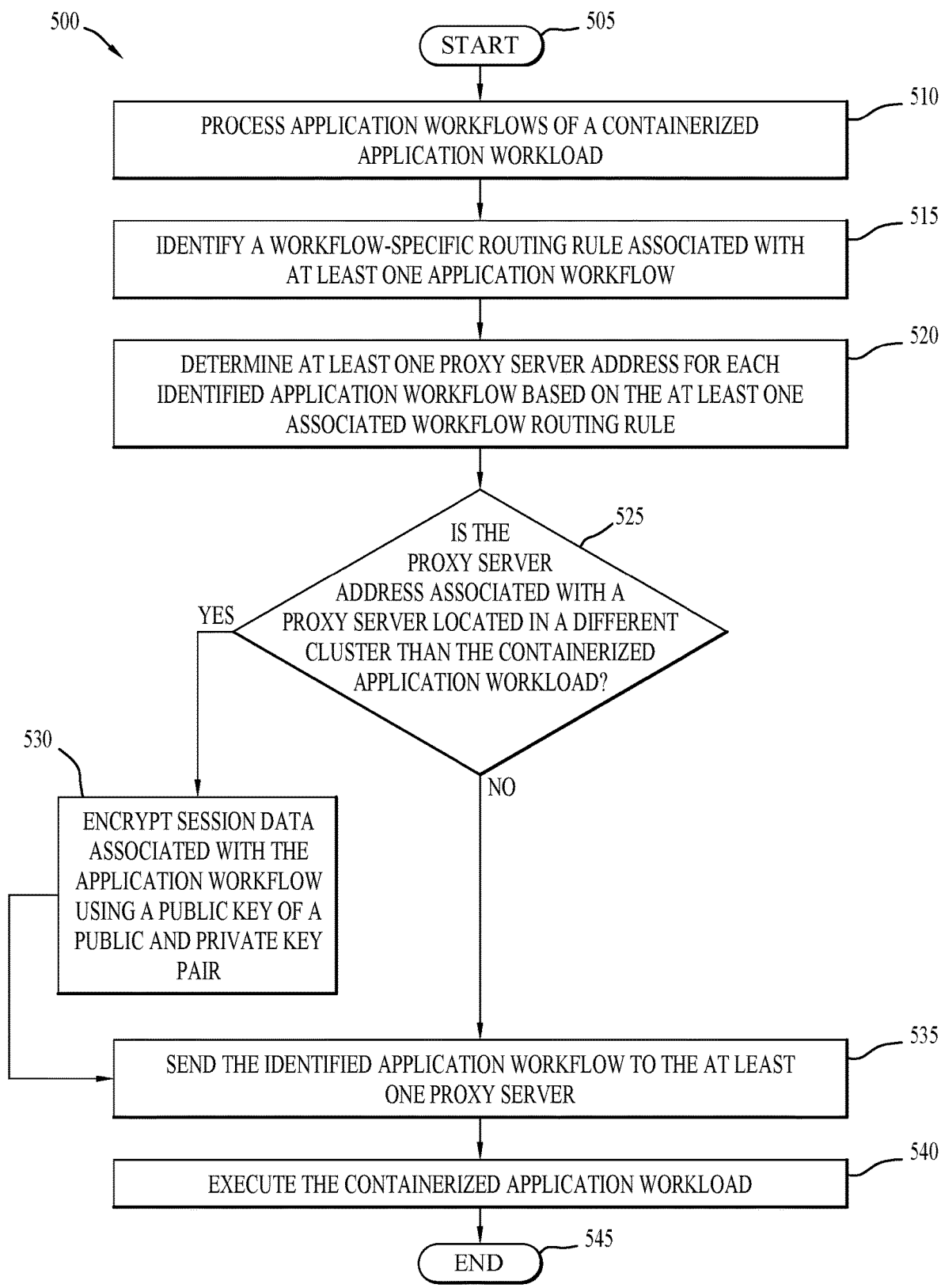
FIG. 5 illustrates an example method for redirecting service and API calls for containerized applications and for encrypting the service and API calls for containerized applications, according to some embodiments of the present disclosure.

Various embodiments may perform some, all, or none of the steps described above. For example, certain embodiments may omit steps 435 under certain conditions. Furthermore, certain embodiments may perform these steps in a different order or in parallel. Moreover, one or more steps may be repeated. For example, steps 415-435 may be repeated for any number of application workflows. While discussed as container 310*a*, container 310*b*, and proxy server 330 performing the steps of this method, any suitable component of computer networks 100, 200, and 300 may perform one or more steps of the method FIG. 5 illustrates an example method for redirecting service and API calls for containerized applications and for encrypting the service and API calls for containerized applications, according to some embodiments of the present disclosure.

At step 505, method 500 begins. In some embodiments, method 500 begins by container 310*a* storing at least one workflow-specific routing rule and production related primitives for a plurality of application workflows. Container 310*a* may then receive a production execution command. Once the production execution command has been received, container 310*a* may generate a containerized application workload using the production related primitives. In some embodiments, once the containerized application workload has been generated, then container 310*a* may execute the containerized application workload.

At step 510, container 310*a* processes application workflows of a containerized application workload. In some embodiments, container 310*a* may process application workflows by determining which application services each application workflow may call when executed.

At step 515, container 310*a* identifies a workflow-specific routing rule associated with at least one application workflow. In some embodiments, container 310*a* identifies a workflow-specific routing rule for an application workflow by determining whether there is a policy applied to the application workflow. In some embodiments, container 310*a* identifies a workflow-specific routing rule for an application workflow by identifying each application service that an application workflow seeks to call on when executed. In some embodiments, container 310*a* stores the identified routing rules associated with the application workflow in a routing table.

At step 520, API server 320 determines at least one proxy server address for each identified application workflow based on at least one routing rule associated with an application workflow. In some embodiments, step 420 begins when resolve DNS flow 380 includes a flow of data that indicates that container 310*a* seeks to communicate to a service running on container 310*b* and needs API server 320 to resolve the DNS of container 310*b*. If proxy services are needed, then in certain embodiments resolve DNS flow 380 may include data indicating that it needs to communicate to proxy server 330 via tunnel 340. API server 320 may determine a proxy server address by resolving the DNS of the application service that an application workflow running on container 310*a* seeks to communicate with. For example, API server 320 may be given the application and namespace of the application service that an application service running on container 310*a* seeks to communicate with. Based on the application and namespace of the application service, API server 320 may resolve the DNS container 310*b* and based on the address of that container, API server 320 may provide proxy server address to proxy server 330.

At step 525, container 310*a* determines whether the proxy server address is associated with a proxy server located in a different cluster than the containerized application workload. If the proxy server address is associated with a proxy server located in a different cluster than the container 310*a*, then method 500 proceeds to 530. If the proxy server address is associated with a proxy server located in the same cluster as the container 310*a*, then method 500 proceeds to step 535.

At step 530, container 310*a* encrypts the session data associated with the application workflow using a public key of a public and private key pair. In some embodiments, API server 320 may establish tunnel 340 from container 310*a* to proxy server 330 based on the proxy server address of proxy server 330 that it determined at step 420. Method 500 then proceeds to step 535.

At step 535, container 310*a* sends the identified application workflow to proxy server 330. In some embodiments, API server 320 may establish tunnel 340 from container 310*a* to proxy server 330 based on the proxy server address of proxy server 330 that it determined at step 520.

At step 540, one or more devices in network 300 executes the containerized application workload including the identified application workflow.

At step 545, method 500 may end. In some embodiments, method 500 may then proceed to additional steps according to the present disclosure.

Various embodiments may perform some, all, or none of the steps described above. For example, certain embodiments may omit steps 535 under certain conditions. Furthermore, certain embodiments may perform these steps in a different order or in parallel. Moreover, one or more steps may be repeated. For example, steps 515-535 may be repeated for any number of application workflows. While discussed as container 310*a*, container 310*b*, and proxy server 330 performing the steps of this method, any suitable component of computer networks 100, 200, and 300 may perform one or more steps of the method.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
   one or more processors; and
   one or more computer-readable non-transitory storage media comprising instructions that, when executed by the one or more processors, cause one or more components of the system to perform operations comprising:
      processing a plurality of application workflows of a containerized application workload;
      identifying at least one application workflow of the plurality of application workflows and at least one workflow-specific routing rule associated with the at least one application workflow;
      determining at least one proxy server address for each identified application workflow based on:
         the at least one associated workflow-specific routing rule; and
         a domain name service name and a service identity associated with each identified application workflow; and
      communicating the at least one identified application workflow to at least one proxy server using the at least one determined proxy server addresses.

2. The system of claim 1, the operations further comprising:
   storing the at least one workflow-specific routing rule and production related primitives for the plurality of application workflows;
   receiving a production execution command;
   generating the containerized application workload using a set of the production related primitives; and
   executing the containerized application workload.

3. The system of claim 1, the operations further comprising:
   communicating at least one other application workflow to one or more nodes.

4. The system of claim 1, the operations further comprising:
   encrypting session data associated with the at least one application workflow using a public key of a public and private key pair.

5. The system of claim 1, wherein determining the at least one proxy server address comprises determining the at least one proxy server address using a container network interface plugin.

6. The system of claim 1, the operations further comprising:
   determining, for each identified application workflow, whether each identified application workflow needs to be communicated to the at least one proxy server.

7. A method, comprising:
   processing a plurality of application workflows of a containerized application workload;

identifying at least one application workflow of the plurality of application workflows and at least one workflow-specific routing rule associated with the at least one application workflow;
determining at least one proxy server address for each identified application workflow based on:
the at least one associated workflow-specific routing rule; and
a domain name service name and a service identity associated with each identified application workflow; and
communicating the at least one identified application workflow to at least one proxy server using the at least one determined proxy server addresses.

8. The method of claim 7, further comprising:
storing the at least one workflow-specific routing rule and production related primitives for the plurality of application workflows;
receiving a production execution command;
generating the containerized application workload using a set of the production related primitives; and
executing the containerized application workload.

9. The method of claim 7, further comprising:
communicating at least one other application workflow to one or more nodes.

10. The method of claim 7, further comprising:
encrypting session data associated with the at least one application workflow using a public key of a public and private key pair.

11. The method of claim 7, wherein:
determining the at least one proxy server address comprises determining the at least one proxy server address using a container network interface plugin.

12. The method of claim 7, further comprising:
determining, for each identified application workflow, whether each identified application workflow needs to be communicated to the at least one proxy server.

13. One or more computer-readable non-transitory storage media embodying instructions that, when executed by a processor, cause the processor to perform operations comprising:
processing a plurality of application workflows of a containerized application workload;
identifying at least one application workflow of the plurality of application workflows and at least one workflow-specific routing rule associated with the at least one application workflow;
determining at least one proxy server address for each identified application workflow based on:
the at least one associated workflow-specific routing rule; and
a domain name service name and a service identity associated with each identified application workflow; and
communicating the at least one identified application workflow to at least one proxy server using the at least one determined proxy server addresses.

14. The one or more computer-readable non-transitory storage media of claim 13, the operations further comprising:
storing the at least one workflow-specific routing rule and production related primitives for the plurality of application workflows;
receiving a production execution command;
generating the containerized application workload using a set of the production related primitives; and
executing the containerized application workload.

15. The one or more computer-readable non-transitory storage media of claim 13, the operations further comprising:
encrypting session data associated with the at least one application workflow using a public key of a public and private key pair.

16. The one or more computer-readable non-transitory storage media of claim 13, wherein:
determining the at least one proxy server address comprises determining the at least one proxy server address using a container network interface plugin.

17. The one or more computer-readable non-transitory storage media of claim 13, the operations further comprising:
determining, for each identified application workflow, whether each identified application workflow needs to be communicated to the at least one proxy server.

* * * * *